United States Patent Office 2,708,089
Patented May 10, 1955

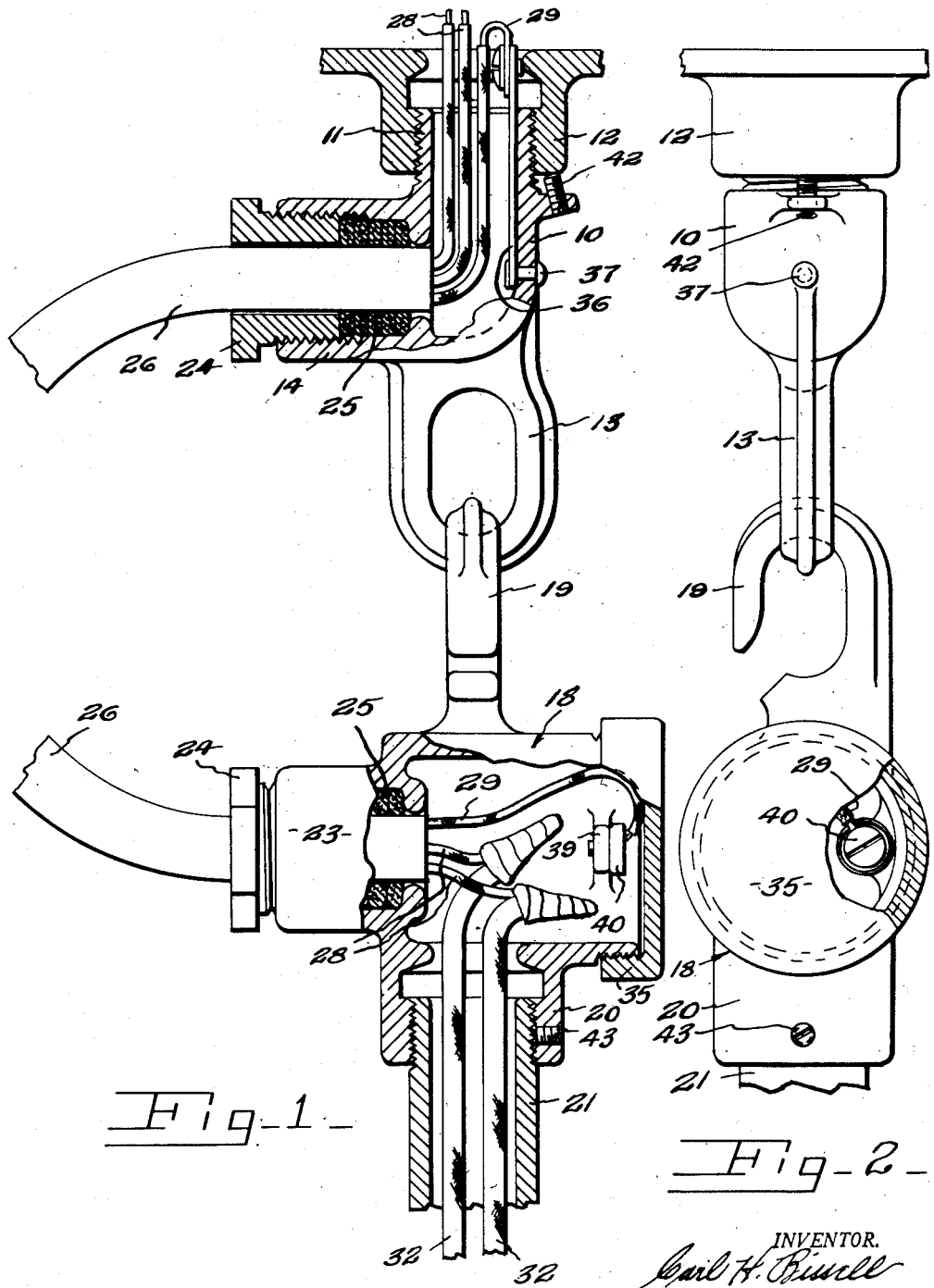

2,708,089

FLEXIBLE FIXTURE HANGER

Carl H. Bissell, Syracuse, N. Y., assignor to Crouse-Hinds Company, Syracuse, N. Y., a corporation of New York Application February 5, 1951, Serial No. 209,428

3 Claims. (Cl. 248—344)

This invention relates to flexible fixture hangers of the type commonly employed for suspending electrical fixtures, such as lighting units, from a height, the hanger being flexible or functioning to permit a limited movement of the fixture.

This invention has as an object a flexible fixture hanger embodying a construction by which the conductors are enclosed in a dust tight enclosure preventing the entrance of dust and moisture in the fixture.

The invention consists in the novel features and in the combinations and constructions hereinafter set forth and claimed.

In describing this invention, reference is had to the accompanying drawing in which like characters designate corresponding parts in all the views.

Figure 1 is a side elevational view, with parts shown in section, of a fixture hanger embodying my invention.

Figure 2 is an elevational view looking to the left, Figure 1.

The hanger consists of a supporting member 10 formed with an externally threaded boss 11 for attachment to the hub 12 of a conduit outlet box. The supporting member 10 is formed with a depending loop 13 and with a laterally extending boss 14. A fixture supporting member 18 is formed with an upwardly extending hook 19 positioned in the loop 13 and with a depending hub portion 20 threaded internally to receive the stem 21 of a fixture. The loop 13 and the hook 19 form a flexible linkage for connecting the members 10, 18, together.

The member 18 is also formed with a hub portion 23. The hub portions 14, 23, of these members are threaded internally to receive gland nuts 24 for compressing a gland packing 25 about the ends of a conductor 26 which is preferably in the form of a flexible cable containing power wires 28 and a ground wire 29. The wires 28 are connected to the feed wires in the conduit outlet box and to the conductors 32 extending through the fixture stem 21. The connection to the conductors 32 is effected in the fixture supporting member 18 and for the convenience of making such connection, the member is formed with a large work opening preferably arranged in register with the boss 23 and on the opposite side of the member, the opening being provided with a detachable closure 35. The ground conductor 29 is attached to a strap terminal 36 secured to the supporting member 10, as by rivet 37, and the opposite end of the ground wire 29 is attached to a boss 39 formed on the interior of the supporting member 18 by a screw 40. The supporting member 10 may be provided with a set screw 42 to prevent turning movement of the supporting member in the outlet box, and the fixture carrying member may be provided with a set screw 43 to restrain rotation of the fixture stem 21.

With this arrangement, the ends of the cable 26 are secured in the members 10, 18, in dust tight and moisture tight relation, thus preventing the entrance of dust or moisture into the fixture stem 21.

What I claim is:

1. A flexible fixture hanger comprising a hollow supporting member having means for attachment to a conduit outlet box and being formed with a laterally extending boss, a fixture supporting member including a hollow housing having a laterally extending boss and a depending hub portion for connection to a fixture stem, said members being connected by flexible linkage, a flexible cable having its ends positioned in said laterally extending bosses and extending therethrough, and packing gland means cooperable to secure the ends of the cable in dust tight relation to said members.

2. A flexible fixture hanger comprising a supporting member having a depending loop, and means for detachably securing the member to a conduit outlet box, a fixture carrying member provided with a hook positioned in said loop and having means for attachment to a fixture, each of said members being formed with a laterally extending boss having a passage communicating with the interior of the members, a flexible cable having its ends positioned in said passages, and gland means operable to secure the ends of the cable in said passages in dust tight relation thereto, said fixture supporting member being formed with a work opening arranged in registration with the laterally extending boss of said member and a detachable cover for said opening.

3. A flexible fixture hanger comprising an upper hollow supporting member having a threaded hub for attachment to a conduit outlet box, a lower hollow fixture carrying member having a depending threaded hub portion for connection to a fixture, said upper and lower members being connected together by a loop and hook structure, each of said members being formed with a laterally extending hollow boss, a flexible cable having its ends extending into and through said laterally extending bosses, said lower fixture carrying member being formed with a work opening in the side thereof arranged in registration with the laterally extending boss of said member, a closure detachably secured to said opening, and a dust tight packing gland arranged in each of said laterally extending bosses and engaging the end portions of said cable.

References Cited in the file of this patent

UNITED STATES PATENTS

| | | |
|---|---|---|
| 1,407,527 | Goldick | Feb. 21, 1922 |
| 1,929,905 | Slotsky | Oct. 10, 1933 |
| 2,107,865 | Jackson | Feb. 8, 1938 |
| 2,299,878 | Chandler | Oct. 27, 1942 |
| 2,349,924 | Anderson | May 30, 1944 |
| 2,402,840 | Olley | June 25, 1946 |
| 2,456,997 | Sachs | Dec. 21, 1948 |